United States Patent
Hsu

(10) Patent No.: US 8,888,368 B2
(45) Date of Patent: *Nov. 18, 2014

(54) ROLLER RETAINING CHAIN

(71) Applicant: Chieftek Precision Co., Ltd, Tainan (TW)

(72) Inventor: Ming-che Hsu, Tainan (TW)

(73) Assignee: Chieftek Precision Co., Ltd, Tainan (TW)

(*) Notice: Subject to any disclaimer, the term of this patent is extended or adjusted under 35 U.S.C. 154(b) by 0 days.

This patent is subject to a terminal disclaimer.

(21) Appl. No.: 13/942,025

(22) Filed: Jul. 15, 2013

(65) Prior Publication Data
US 2014/0177986 A1 Jun. 26, 2014

(30) Foreign Application Priority Data

Dec. 22, 2012 (TW) .............................. 101224926 U

(51) Int. Cl.
*F16C 29/06* (2006.01)
*F16C 33/50* (2006.01)

(52) U.S. Cl.
CPC .................................. *F16C 33/506* (2013.01)
USPC ............................................. 384/51; 384/44

(58) Field of Classification Search
USPC ................................................... 384/44, 51
See application file for complete search history.

(56) References Cited

U.S. PATENT DOCUMENTS

| 8,297,843 B2* | 10/2012 | Hsu ................................. 384/45 |
| 8,408,796 B1* | 4/2013 | Hsu ................................. 384/45 |
| 2007/0076989 A1* | 4/2007 | Matsumoto et al. ............ 384/45 |
| 2008/0019622 A1* | 1/2008 | Chen .............................. 384/51 |

FOREIGN PATENT DOCUMENTS

TW 201329357 A 7/2013

* cited by examiner

Primary Examiner — Thomas R. Hannon
(74) Attorney, Agent, or Firm — Muncy, Geissler, Olds & Lowe, P.C.

(57) ABSTRACT

A roller retaining chain includes a carrier belt extending along a longitudinal direction and multiple holes are defined through the carrier belt so as to respectively receive a roller therein. A retainer is located between any two adjacent holes and each of the retainers includes a first part and a bottom part. The first/second part has a first/second face facing the hole. Each of the first and second faces has a guide member and each guide member has a guide face which is perpendicular to the longitudinal direction. The two respective guide faces are located on the same plane. Each of the guide faces has an inclined stop face extending therefrom so as to retain the roller in the hole. Each roller is in contact with the two guide faces to prevent from being tilt.

3 Claims, 7 Drawing Sheets

B-B

C-C

D-D

E-E

US 8,888,368 B2

ROLLER RETAINING CHAIN

FIELD OF THE INVENTION

The present invention relates to a roller retaining chain, and more particularly, to a roller retaining chain having retainers and rollers are located between the retainers and do not tilt nor vibrate during the operation/movement of the roller retaining chain.

BACKGROUND OF THE INVENTION

The conventional linear moving mechanism generally comprises a sliding base and a rail assembly which longitudinally extends. The sliding member and the rail assembly each provide at least one rail so as to form one loaded path. The sliding base provides one unloaded path and two direction change paths relative to the loaded path. The two direction change paths connect between the exits and entries of the loaded path and the unloaded path so as to form an endless circulation path. The rollers move endlessly between the loaded path, the direction change paths, and the unloaded path. By the movement of the rollers, the sliding base endlessly moves along the endless circulation path.

In order to prevent impact between the rollers, the sliding base provides retainers which are located between the rollers and connected between two side strips. The rollers are then separated by the retainers to ensure the smooth movement of the roller retaining chain.

Taiwan Patent Application No. 101100196, which titled "Roller Maintaining Chain and Method for Making Roller Maintaining Chain and Linear Movement Device" and is a prior invention of the inventor of the present invention, discloses a covering face located on each of the retainers that are adjacent the holes of the chain, a portion of the covering face is a contacting surface that is perpendicular to the longitudinal direction of the rail and another portion of the covering face is an inclined surface. The chain can be made by way of tilt injection molding which means the two side molds are separated from each other along an inclined line. The contacting surface pushes and guides the rollers to move forward and the inclined surface retains the rollers. The rollers do not drop from the holes even if the chain is removed from the endless circulation path. However, in practical use, the inventor finds that when the contacting surface pushes the rollers to move forward, a single contact point is formed between the roller and the contacting surface, the single contact point makes the rollers sometimes tilt and generate vibration. The vibration affects the movement of the sliding base.

The present invention intends to provide a roller retaining chain for improving the shortcomings mentioned above.

SUMMARY OF THE INVENTION

The present invention relates to a roller retaining chain made by way of tilt injection molding and comprises a carrier belt extending along a longitudinal direction. Multiple holes are defined through the carrier belt and located along the longitudinal direction. Each hole receives a roller therein. A retainer is located between any two adjacent holes and each of the retainers comprises a first part and a bottom part. The first part has a first face facing the hole adjacent thereto and the second part has a second face facing the hole adjacent thereto. The first and second faces are smoothly connected to a parting line. A carrier lateral section is located in a plane defined by the vertical direction and a horizontal direction. The parting line and the diagonal of the carrier lateral section are inclined relative to the horizontal direction. The inclination angle of the parting line is not less than the inclination angle of the diagonal of the plane perpendicular to the radial direction. Each of the first and second faces has a guide member, and each guide member has a guide face which is perpendicular to the longitudinal direction. The first and second faces are formed as two corresponding lateral taper faces divided by the parting line. Each of the first and second faces has a widest lateral side and a narrowest lateral side opposite to the widest lateral side. The widest lateral sides are laterally located opposite to each other. The two guide member are located on the diagonal areas adjacently connecting to the widest lateral sides of the first and second faces respectively, so that the retainer chain is able to be manufactured via tilt injection molding. The two respective guide faces are located on the same plane and contact the roller. Each of the guide faces has an inclined stop face extending therefrom so as to retain the roller in the hole.

One aspect of the present invention is to provide a roller retaining chain and each roller is in contact with two respective guide faces of two guide members so that the rollers are evenly forced and do not tilt when moving forward.

Another aspect of the present invention is that the guide members can be obtained by way of tilt injection molding based on the disclosure of Taiwan Patent Application No. 101100196.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
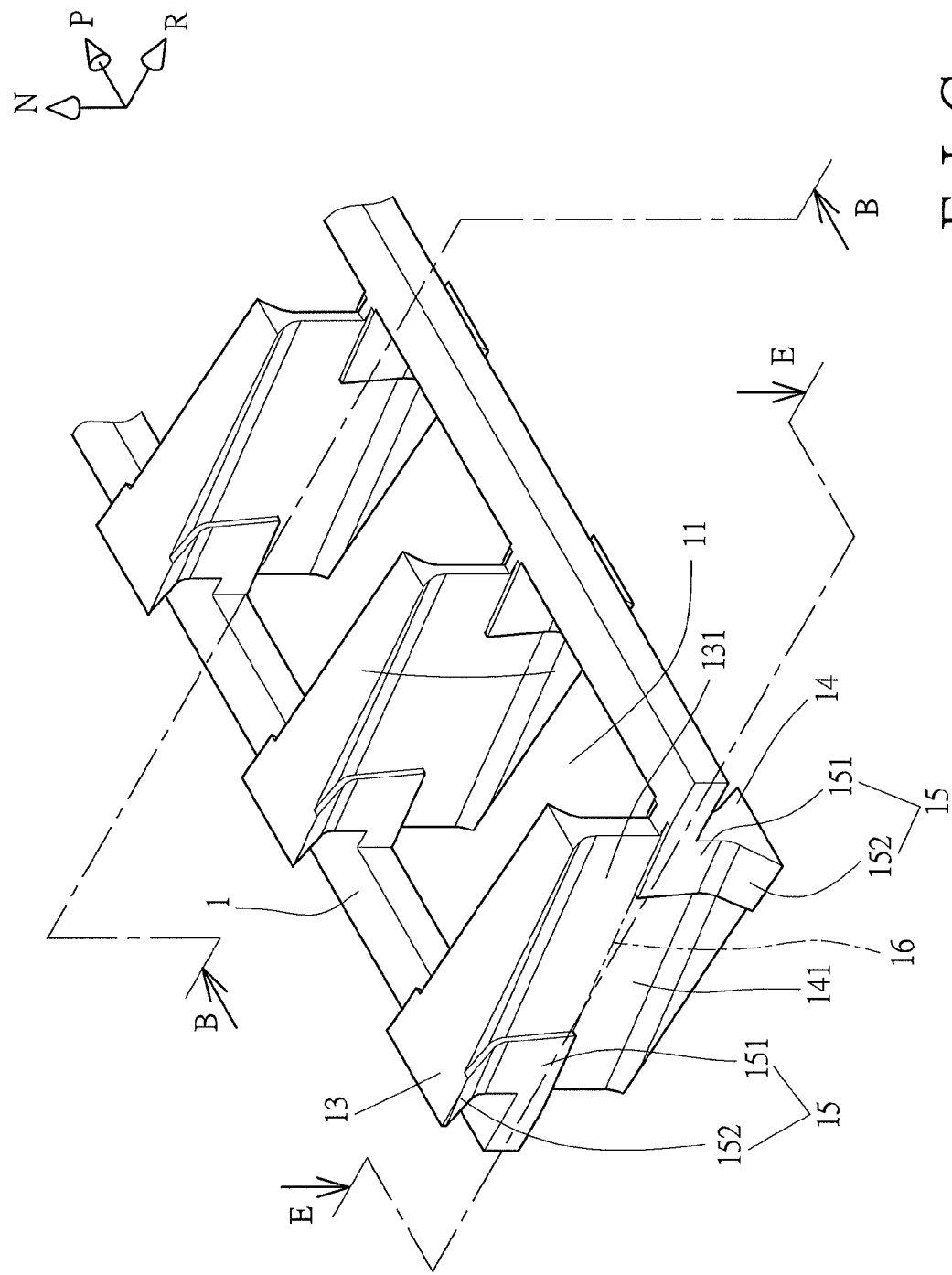
FIG. 1 is a perspective view to show the roller retaining chain of the present invention.
Figure 2:
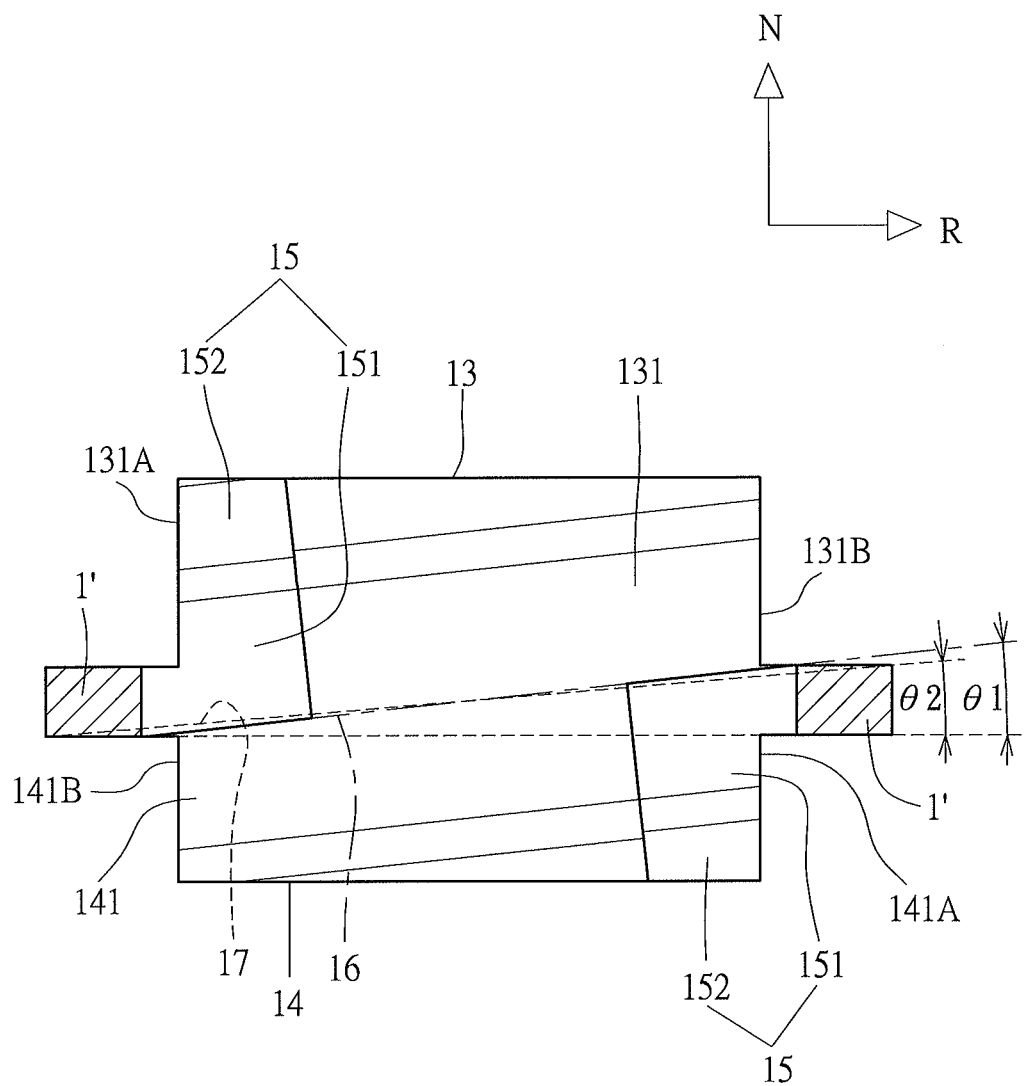
FIG. 2 is a cross sectional view taken along line B-B in FIG. 1.

Referring to FIGS. 1 and 2, the roller retaining chain of the present invention, more particularly the roller retaining chain of the present invention is made by the method of tilt injection molding as stated in Taiwan Patent Application No. 101100196, comprises a carrier belt 1 extending along a longitudinal direction P. Multiple holes 11 are defined through the carrier belt 1 and located along the longitudinal direction P. The depth of each hole 11 is extending along a vertical direction N. The vertical direction N is perpendicular to the longitudinal direction P. A retainer is located between any two adjacent holes 11, and each of the retainers comprises a first part 13 and a second part 14. Preferably, the first part 13 and the second part 14 are located at different sides, such as upper and lower sides, of the retainer of the carrier belt 1. The first part 13 has a first face .131 facing the hole 11 adjacent thereto, and the second part 14 has a second face 141 facing the hole 11 adjacent thereto. The first and second faces 131, 141 are smoothly connected to a parting line 16. Substantially, the first and second faces 131, 141 are formed as two lateral taper faces divided by the parting line 16. Each of the first and second faces 131, 141 has a widest lateral side 131A, 141A and a narrowest lateral side 131B, 141B opposite to the widest lateral side 131A, 141A. The widest lateral sides 131A and 141A are laterally opposite to each other. As the B-B cross section view of the embodiment of the present invention shown in FIG. 2, the carrier belt 1 has a carrier lateral section 1' which is located in a plane defined by the vertical direction N and a horizontal direction R which is perpendicular to the radial direction N. The parting line 16 and the diagonal 17 of the carrier lateral section 1' are inclined relative to the horizontal direction R. The inclination angle θ1 of the parting line 16 is not less than the inclined angle θ2 of the diagonal 17 of the carrier lateral section 1'. Two guide members 15, corresponding to each other, are located/formed on the diagonal areas adjacently connecting to the widest lateral sides 131A, 141A of the first and second faces 131, 141 respectively, so that the retainer chain is able to be manufactured via tilt injection molding. Each guide member 15 has a guide face 151 which is perpendicular to the longitudinal direction P. The two respective guide faces 151 are located on the same plane, so that when the retainer chain is in operation, the roller is contacted and pushed by the two guide faces 151. Each of the guide faces 151 has an inclined stop face 152 extending therefrom so as to retain the roller in the hole 11. Preferably, each inclined stop face 152 extends from the guide face 151 toward a facing direction that the guide face 151 faces the hole 11 and concurrently toward a biasing direction biasing from the hole 11. Preferably, the inclined stop face 152 is an inclined and flat surface. Utilizing the manufacturing method mentioned in the disclosure of Taiwan Patent Application No. 101100196, the carrier belt 1 is obtained and completed by one-shot molding of tilt injection molding without any interference during the two side molds are separated along the inclined parting line 16.

Figure 3:
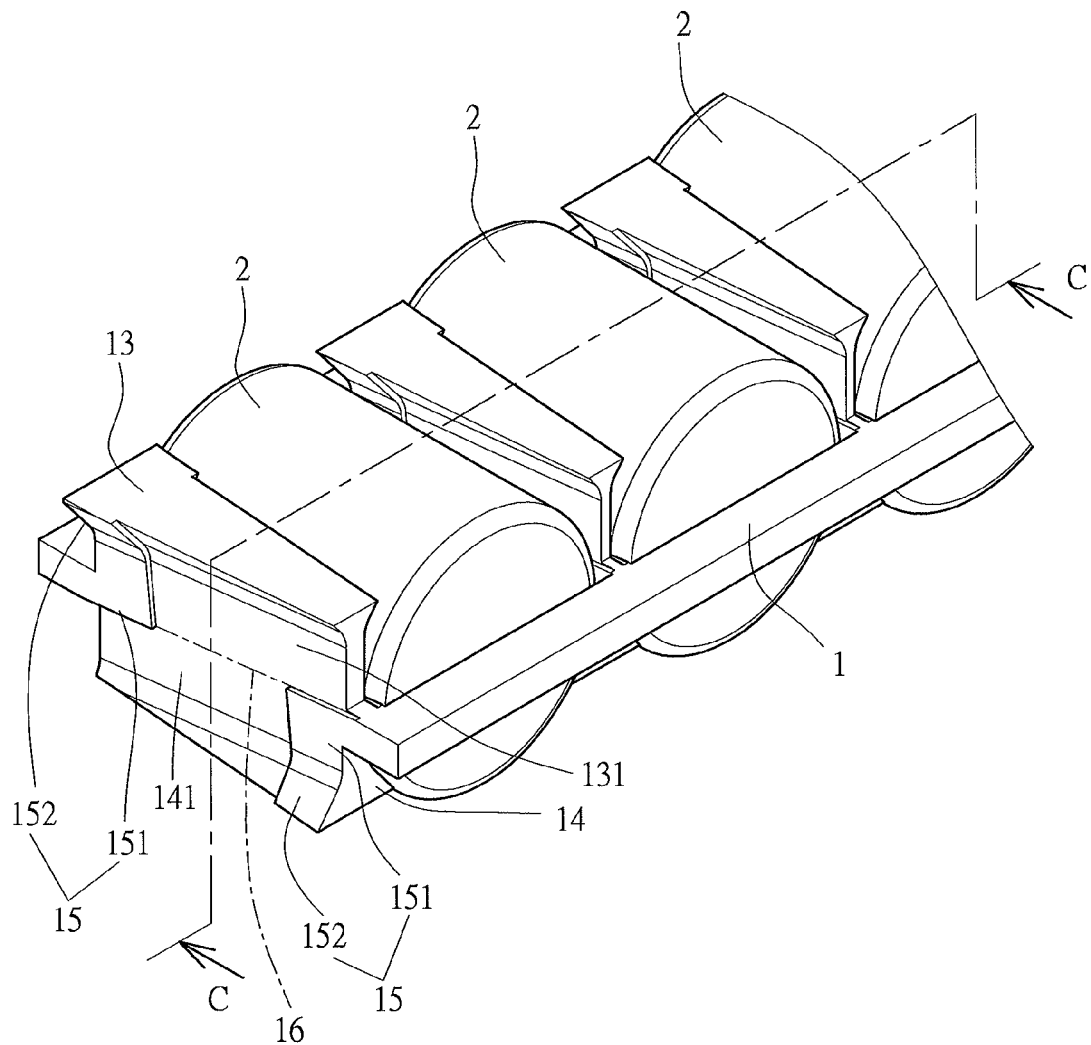
FIG. 3 shows that rollers are installed to the roller retaining chain of the present invention.
Figure 4:
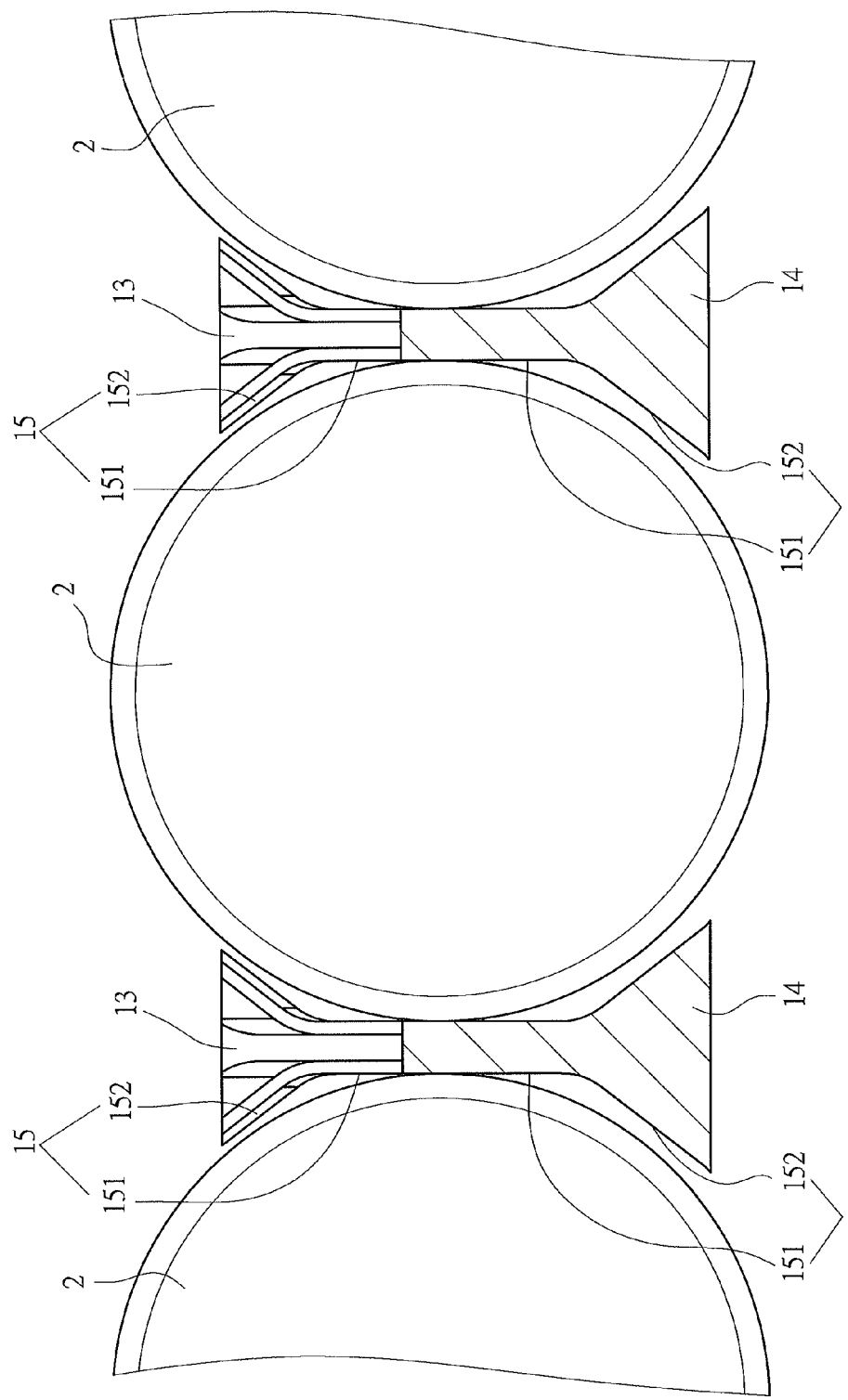
FIG. 4 is a cross sectional view taken along line C-C in FIG. 3.

As shown in FIG. 3, the rollers 2 are then installed to the holes 11 and the guide faces 151 contact the rollers 2 in the holes 11 as shown in FIG. 4. The rollers 2 are stopped/retained by the inclined stop face 152.

Figure 5:
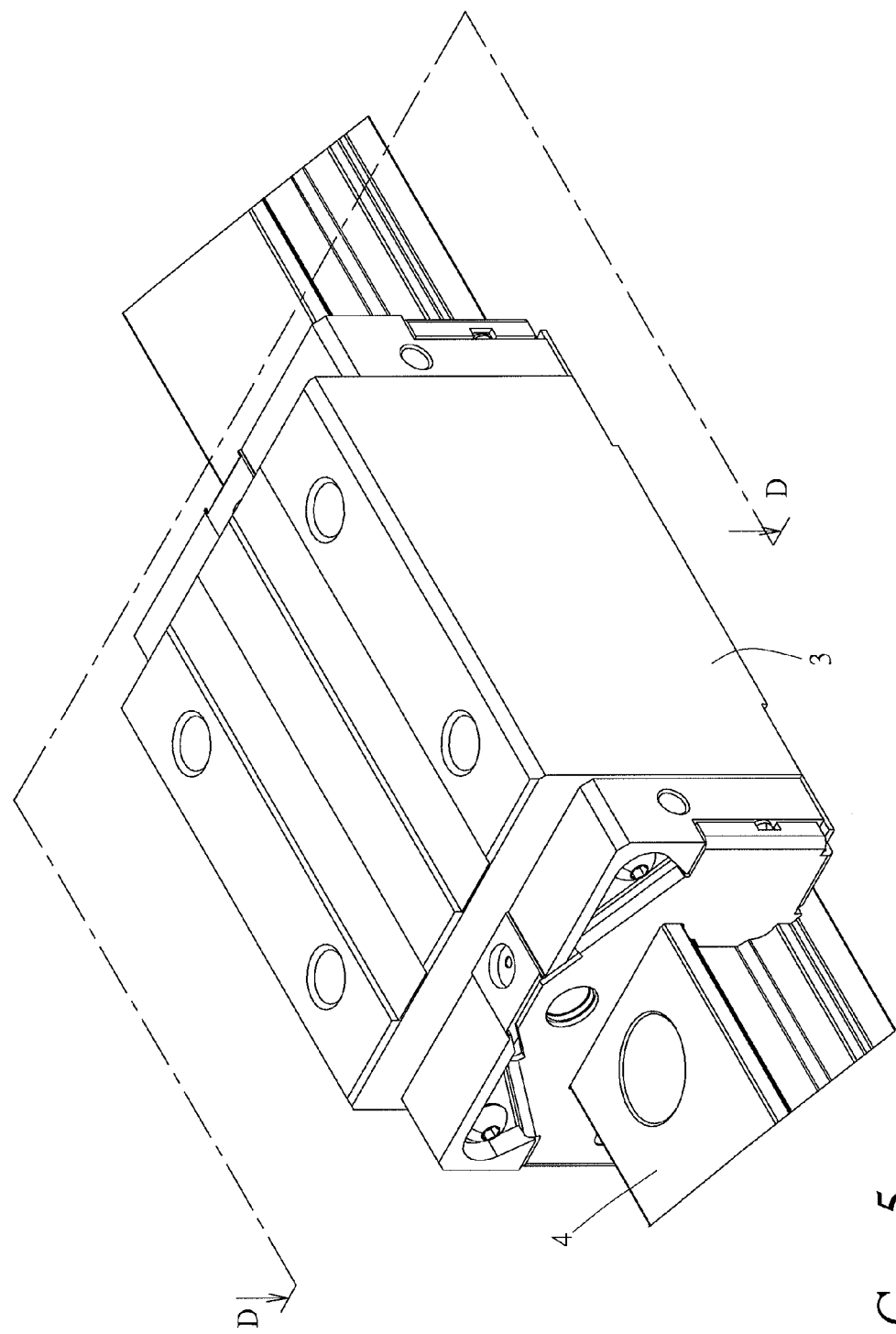
FIG. 5 shows the rail assembly and the sliding base that are cooperated with the roller retaining chain of the present invention.
Figure 6:
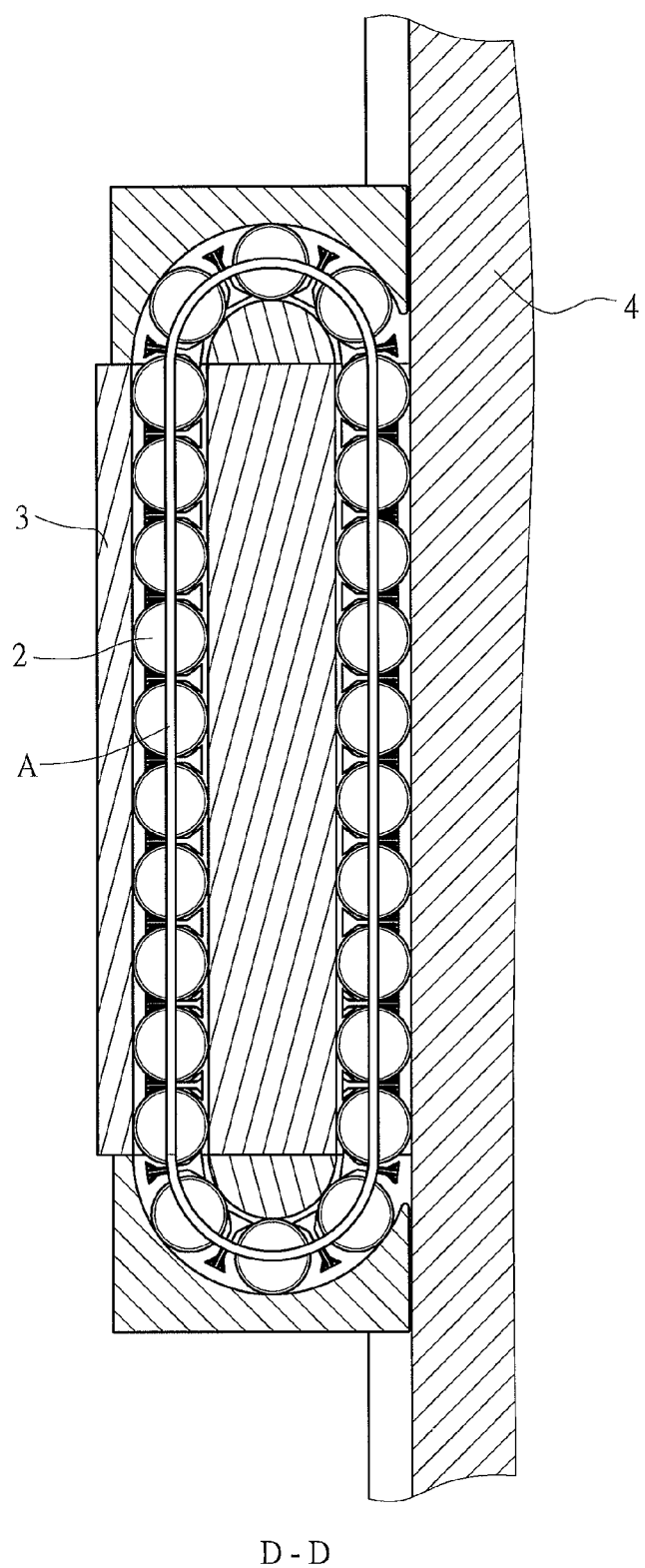
FIG. 6 is a cross sectional view taken along line D-D in FIG. 5.

As shown in FIGS. 5 and 6, the carrier belt 1 with the rollers 2 installed thereto is installed to the linear sliding assembly. The rollers 2 are configured to move/roll in the endless circulation path, so that the sliding base 3 smoothly moves along the sliding rail 4.

Figure 7:
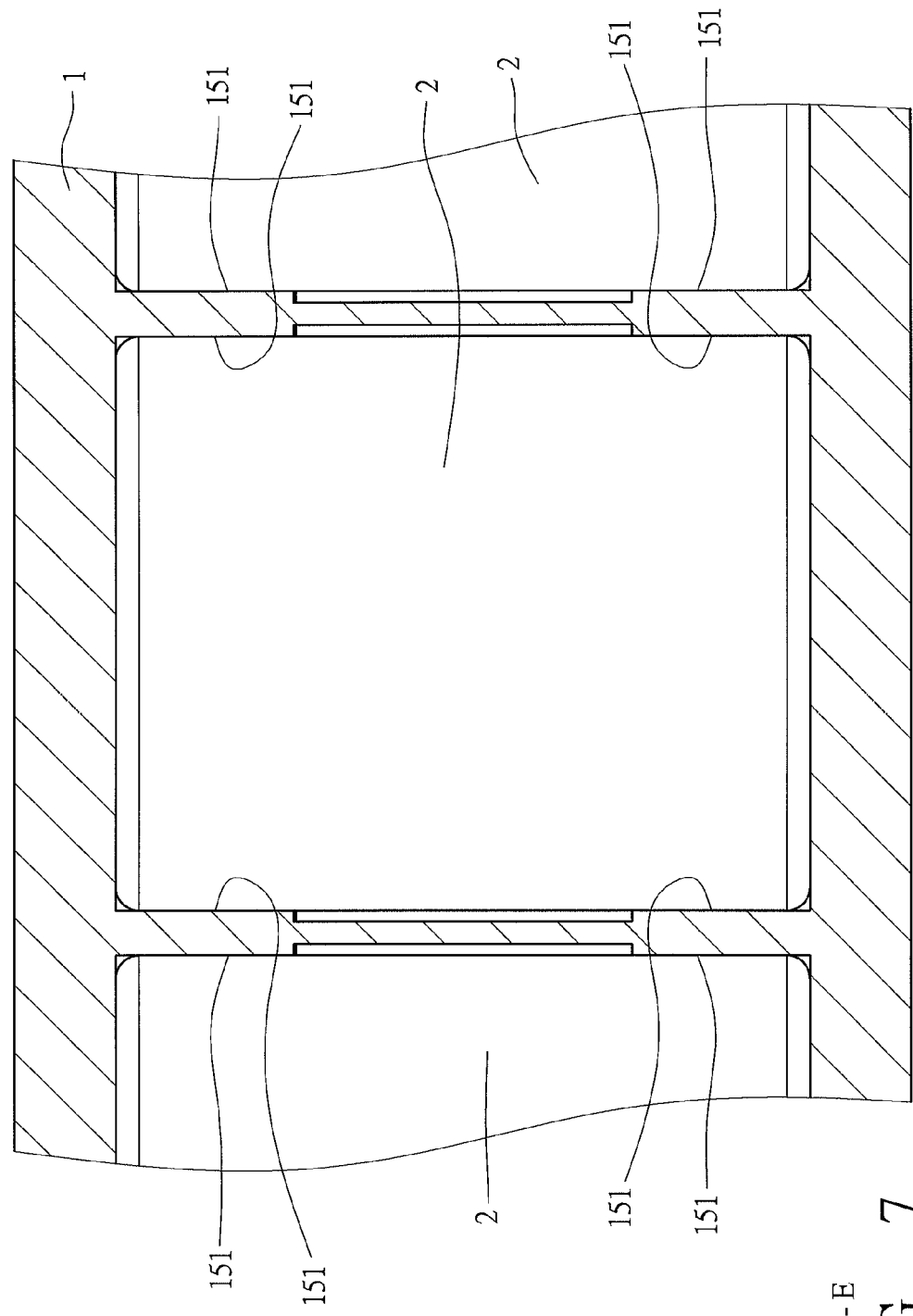
FIG. 7 is a cross sectional view taken along line E-E in FIG. 1.

As shown in FIG. 7 which is a cross sectional view taken along line E-E in FIG. 1. When the rollers 2 moved in the endless circulation path of the linear sliding assembly, the guide faces 151 contact the rollers 2 at two respective positions of each roller 2 so as to move the rollers 2 forward. Therefore, the rollers 2 are evenly pushed and do not tilt during movement to ensure that the sliding base 3 moves along the sliding rail 4 smoothly.

While we have shown and described the embodiment in accordance with the present invention, it should be clear to those skilled in the art that further embodiments may be made without departing from the scope of the present invention.

What is claimed is:

1. A roller retaining chain made by way of tilt injection molding and comprising a carrier belt extending along a longitudinal direction, multiple holes defined through the carrier belt and located along the longitudinal direction, each hole receiving a roller therein, a retainer located between any two adjacent holes, each of the retainers comprising a first part and a second part, the first part having a first face facing the hole adjacent thereto, the second part having a second face facing the hole adjacent thereto, the first and second faces smoothly connected to a parting line, each of the first and second faces having a guide member, each guide member having a guide face which is perpendicular to the longitudinal direction, the two respective guide faces located on the same plane and are configured to contact the roller, each of the guide faces having an inclined stop face extending therefrom so as to retain the roller in the hole.

2. The chain as claimed in claim 1, wherein the inclined stop face is an inclined and flat surface.

3. The chain as claimed in claim 1, wherein the carrier belt has a carrier lateral section which is located in a plane defined by a vertical direction and a horizontal direction, the parting line and a diagonal of the carrier lateral section are inclined relative to the horizontal direction, an inclination angle of the parting line is not less than an inclined angle of the diagonal of the carrier lateral section, the first and second faces are formed as two corresponding lateral taper faces divided by the parting line, each of the first and second faces has a widest lateral side and a narrowest lateral side opposite to the widest lateral side, the widest lateral sides of the first and second faces are laterally opposite to each other, the two guide members are located at two diagonal areas adjacently connecting to the widest lateral sides of the first and second faces respectively.

* * * * *